United States Patent
Kodama et al.

(10) Patent No.: US 8,285,824 B2
(45) Date of Patent: Oct. 9, 2012

(54) STORAGE SYSTEM AND DATA REPLICATION METHOD THAT REFUSES ONE OR MORE REQUESTS FOR CHANGING THE FIRST LOGICAL CONFIGURATION INFORMATION UNTIL THE FIRST STORAGE APPARATUS AND SECOND STORAGE APPARATUS ARE SYNCHRONIZED

(75) Inventors: Shoji Kodama, Sagamihara (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 591 days.

(21) Appl. No.: 11/510,568

(22) Filed: Aug. 28, 2006

(65) Prior Publication Data
US 2008/0005288 A1 Jan. 3, 2008

(30) Foreign Application Priority Data
Jun. 29, 2006 (JP) .................. 2006-179430

(51) Int. Cl.
*G06F 7/00* (2006.01)
*G06F 13/00* (2006.01)
*G06F 13/12* (2006.01)
*G06F 15/16* (2006.01)
*G06F 15/177* (2006.01)

(52) U.S. Cl. ........ 709/221; 707/610; 707/620; 709/219; 710/74; 711/152; 711/162

(58) Field of Classification Search .......... 709/221, 709/219; 707/610, 620; 710/74; 711/152, 711/162
See application file for complete search history.

(56) References Cited

U.S. PATENT DOCUMENTS

| | | | | |
|---|---|---|---|---|
| 4,811,216 A | * | 3/1989 | Bishop et al. ......... | 711/153 |
| 5,093,913 A | * | 3/1992 | Bishop et al. ......... | 711/152 |
| 5,155,845 A | * | 10/1992 | Beal et al. ......... | 714/6 |
| 5,402,428 A | * | 3/1995 | Kakuta et al. ......... | 714/5.11 |
| 5,544,347 A | * | 8/1996 | Yanai et al. ......... | 711/162 |
| 5,664,186 A | * | 9/1997 | Bennett et al. ......... | 1/1 |
| 5,742,792 A | * | 4/1998 | Yanai et al. ......... | 711/162 |
| 5,799,323 A | * | 8/1998 | Mosher et al. ......... | 707/202 |
| 5,809,224 A | * | 9/1998 | Schultz et al. ......... | 714/7 |
| 5,901,327 A | * | 5/1999 | Ofek ......... | 710/5 |
| 6,044,444 A | * | 3/2000 | Ofek ......... | 711/162 |
| 6,052,797 A | * | 4/2000 | Ofek et al. ......... | 714/6 |
| 6,157,991 A | * | 12/2000 | Arnon ......... | 711/161 |
| 6,173,377 B1 | * | 1/2001 | Yanai et al. ......... | 711/162 |
| 6,237,008 B1 | * | 5/2001 | Beal et al. ......... | 707/204 |

(Continued)

FOREIGN PATENT DOCUMENTS
EP    1 313 017    5/2003
(Continued)

*Primary Examiner* — J Bret Dennison
*Assistant Examiner* — Daniel C Murray
(74) *Attorney, Agent, or Firm* — Antonelli, Terry, Stout & Kraus, LLP.

(57) ABSTRACT

A storage system has two storage apparatuses. Those storage apparatuses include a logical configuration information of a data storage area, an identification unit that identifies one or more requests for changing the logical configuration information from among one or more requests sent from the host system and a transmission unit. When the identification unit identifies to change data, a first storage apparatus updates its own configuration information and the transmission unit sends each of the one or more requests for changing the first logical configuration information to a second storage apparatus. When the second storage apparatus receives the requests, the second storage apparatus updates its own logical configuration information based on the one or more requests for changing.

15 Claims, 14 Drawing Sheets

U.S. PATENT DOCUMENTS

| | | | |
|---|---|---|---|
| 6,243,824 B1 * | 6/2001 | Kakuta et al. ................ 714/3 |
| 6,457,109 B1 * | 9/2002 | Milillo et al. ............. 711/162 |
| 6,502,205 B1 * | 12/2002 | Yanai et al. ................... 714/7 |
| 6,625,705 B2 * | 9/2003 | Yanai et al. ............... 711/162 |
| 6,647,474 B2 * | 11/2003 | Yanai et al. ............... 711/162 |
| 6,996,743 B2 * | 2/2006 | Knapp, III ..................... 714/6 |
| 7,219,201 B2 * | 5/2007 | Kasako et al. ............. 711/162 |
| 7,219,208 B2 * | 5/2007 | Nagashima et al. ........ 711/170 |
| 7,380,032 B2 * | 5/2008 | Innan et al. ................. 710/74 |
| 7,409,470 B2 * | 8/2008 | Halstead et al. ............ 710/32 |
| 7,430,648 B2 * | 9/2008 | Kasako et al. ............. 711/162 |
| 7,447,855 B2 * | 11/2008 | Suishu et al. .............. 711/162 |
| 7,454,583 B2 | 11/2008 | Yagisawa et al. |
| 7,472,243 B2 | 12/2008 | Nagata et al. |
| 7,496,718 B2 * | 2/2009 | Ohno et al. ................. 711/152 |
| 7,512,643 B2 * | 3/2009 | Kobayashi et al. ......... 707/204 |
| 7,512,757 B2 * | 3/2009 | Hiraiwa et al. ............ 711/162 |
| 7,523,148 B2 * | 4/2009 | Suzuki et al. .............. 707/204 |
| 7,565,501 B2 | 7/2009 | Mogi et al. |
| 7,568,080 B2 * | 7/2009 | Prahlad et al. ............. 711/162 |
| 7,644,244 B2 | 1/2010 | Homma et al. |
| 7,680,996 B2 * | 3/2010 | Komarov et al. ........... 711/162 |
| 7,680,997 B1 * | 3/2010 | Specht et al. .............. 711/162 |
| 7,689,790 B2 * | 3/2010 | Maki et al. ................. 711/161 |
| 7,725,668 B2 * | 5/2010 | Akutsu et al. ............. 711/162 |
| 7,765,372 B2 * | 7/2010 | Nagata et al. .............. 711/162 |
| 2002/0010762 A1 | 1/2002 | Kodama |
| 2002/0138696 A1 | 9/2002 | Kodama et al. |
| 2003/0115433 A1 | 6/2003 | Kodama |
| 2003/0229764 A1 | 12/2003 | Ohno et al. |
| 2003/0236850 A1 | 12/2003 | Kodama |
| 2004/0098547 A1 * | 5/2004 | Ofek et al. ................. 711/162 |
| 2004/0107315 A1 | 6/2004 | Watanabe et al. |
| 2004/0128442 A1 | 7/2004 | Hinshaw et al. |
| 2004/0148443 A1 * | 7/2004 | Achiwa ........................ 710/36 |
| 2004/0193660 A1 * | 9/2004 | Gagne et al. ................ 707/204 |
| 2004/0193795 A1 * | 9/2004 | Takeda et al. .............. 711/113 |
| 2004/0210726 A1 | 10/2004 | Nishikawa et al. |
| 2004/0260736 A1 * | 12/2004 | Kern et al. .................. 707/204 |
| 2004/0267829 A1 * | 12/2004 | Hirakawa et al. ............ 707/200 |
| 2005/0021908 A1 | 1/2005 | Ohno et al. |
| 2005/0033828 A1 * | 2/2005 | Watanabe .................... 709/219 |
| 2005/0038968 A1 * | 2/2005 | Iwamura et al. ............ 711/162 |
| 2005/0050115 A1 * | 3/2005 | Kekre ......................... 707/204 |
| 2005/0060507 A1 * | 3/2005 | Kasako et al. ............. 711/162 |
| 2005/0203972 A1 * | 9/2005 | Cochran et al. ............. 707/204 |
| 2005/0229030 A1 | 10/2005 | Nagashima et al. |
| 2005/0240741 A1 * | 10/2005 | Nagasawa et al. ........... 711/165 |
| 2006/0095700 A1 | 5/2006 | Sato et al. |
| 2007/0220067 A1 * | 9/2007 | Suriyanarayanan et al. .. 707/203 |
| 2009/0043826 A1 * | 2/2009 | Butterworth et al. ........ 707/202 |
| 2009/0063798 A1 * | 3/2009 | Kasako ....................... 711/162 |
| 2009/0083502 A1 * | 3/2009 | Horiuchi et al. ............ 711/161 |
| 2009/0271445 A1 * | 10/2009 | Emaru et al. ................ 707/200 |
| 2010/0036896 A1 * | 2/2010 | Nakagawa et al. .......... 707/204 |
| 2010/0115305 A1 * | 5/2010 | Ichikawa et al. ............ 713/320 |
| 2010/0146232 A1 * | 6/2010 | Maki et al. ................. 711/162 |
| 2011/0314221 A1 * | 12/2011 | Kawada et al. ............. 711/114 |

FOREIGN PATENT DOCUMENTS

| | | |
|---|---|---|
| JP | 2000-112666 | 4/2000 |
| JP | 2000-132343 | 5/2000 |
| JP | 2002-149466 | 5/2002 |
| JP | 2004-13367 | 1/2004 |
| JP | 2004-295465 | 10/2004 |
| JP | 2005-044199 | 2/2005 |
| JP | 2006-127398 | 5/2006 |

* cited by examiner

FIG.4

| APPARATUS PAIR TYPE | PRIMARY |
|---|---|
| CORRESPONDING APPARATUS | DF900SA |
| APPARATUS PAIR STATUS | PAIR |
| LOGICAL VOLUME PAIR STATUS | PAIR |

FIG.5

| REQUEST ID | | 0000001 |
|---|---|---|
| REQUEST TIME | | 2006/04/20 10:00AM |
| REQUEST TYPE | | LOGICAL_VOL_INFO |
| REQUEST CONTENT | COMMAND NAME | CREATE_LUN |
| | PARAMETERS | RG10, 0x00, 1GB |

| REQUEST ID | 0000002 | ~71 |
|---|---|---|
| REQUEST TIME | 2006/04/20  10:01AM | ~72 |
| REQUEST TYPE | DATA_WRITE | ~73 |
| REQUEST CONTENT — COMMAND NAME | WRITE | ~74 |
| REQUEST CONTENT — PARAMETERS | LU0, 4KB, data_address | ~75 |

Table labeled 70.

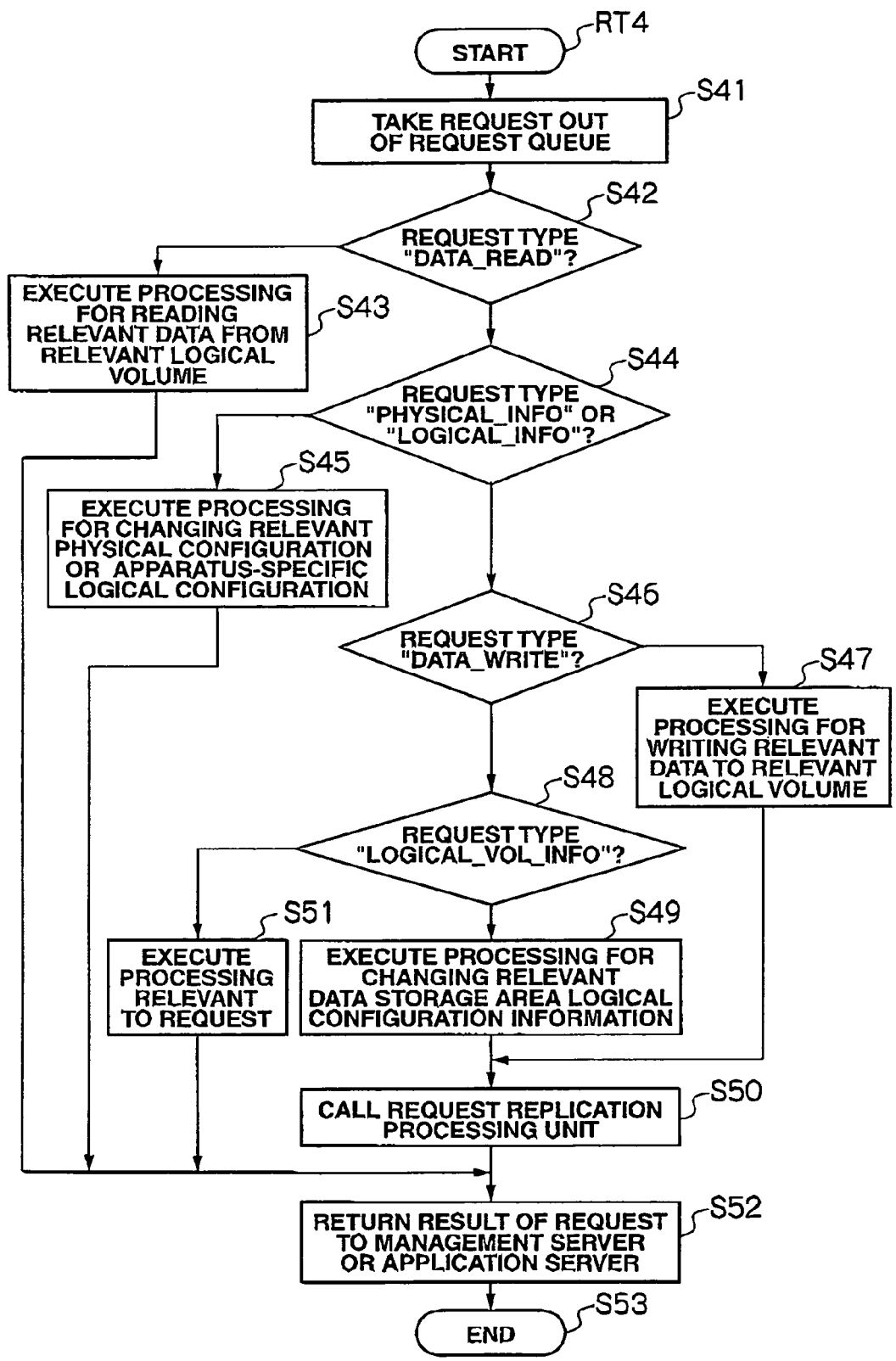

STORAGE SYSTEM AND DATA REPLICATION METHOD THAT REFUSES ONE OR MORE REQUESTS FOR CHANGING THE FIRST LOGICAL CONFIGURATION INFORMATION UNTIL THE FIRST STORAGE APPARATUS AND SECOND STORAGE APPARATUS ARE SYNCHRONIZED

CROSS-REFERENCES TO RELATED APPLICATIONS

This application relates to and claims priority from Japanese Patent Application No. 2006-179430, filed on Jun. 29, 2006, the entire disclosure of which is incorporated herein by reference.

BACKGROUND

The invention relates generally to multiple storage apparatuses connected via networks, and also to a technique of creating a replica of not only data but also configuration information for a storage apparatus in another apparatus.

A conventional data replication technique in which a replica of data is created and the replica of data in a storage apparatus is maintained in another storage apparatus is well known. In this data replication technique where two volumes are designated in advance, the replica of the primary volume is maintained in the secondary volume, by reflecting data changes made in the primary volume in the secondary volume.

The data replication technique is mainly used for disaster recovery. For example, JP-A-2000-132343 discloses a data replication technique in which, if a disaster occurs at a primary site, activity is resumed using the data replica in the volumes in the secondary site, making it possible to continue business.

Also, a conventional technique in which a replica of configuration information relating to the configuration of one storage apparatus is created in another storage apparatus is also well known. For example, JP-A-2005-44199 discloses that a centralized management server can match configuration information for multiple storage apparatuses by requesting the storage apparatuses to make the same change in their configuration information, such as the number of logical volumes or the capacity of logical volumes However, with these conventional techniques, it has not been possible to perform data replication and match configuration information simultaneously.

In other words, the data replication techniques are based on the premise that a logical volume with the same capacity has already been created in each of two storage apparatuses before creating a replica of data in one storage apparatus in the other storage apparatus. A storage apparatus administrator needs to create a logical volume with the same capacity in each of the two storage apparatuses, and pair-up the two volumes before date replication. As stated above, conventional data replication techniques have a problem in that data replication can not be linked with changes in configuration information.

Also, when a centralized management server makes a request to multiple storage apparatuses to make the same change to their respective configuration information, a storage apparatus administrator needs to judge whether or not the configuration information can be changed, depending on the progress of data replication. For example, when deleting a logical volume in both storage apparatuses, if data replication in the secondary volume has not been completed, it is necessary to delay the deletion of the primary volume even though it can already be deleted. As explained above, the technique of a centralized management server matching configuration information has a problem in that it cannot be linked with data replication.

Therefore, a technique of creating a replica of both data and configuration information for one storage apparatus in another storage apparatus and maintaining the replica will make it possible for a storage apparatus administrator to easily manage the storage apparatuses.

SUMMARY

The present invention has been made in light of the above points, and has an objective of providing a storage system and data replication method that offers easy management for an administrator.

In order to achieve the above objective, the present invention provides a storage system including: a first storage apparatus connected to a host system, that stores data transmitted from the host system; and a second storage apparatus connected to the first storage apparatus, that stores backup data for the first storage apparatus, wherein the first storage apparatus includes: an identification unit that identifies one or more requests for changing data storage area logical configuration information from among one or more requests sent from the host system, a first changing unit that changes data storage area logical configuration information for the first storage apparatus based on each of the one or more requests for changing data storage area logical configuration information identified by the identification unit, and a transmission unit that sends each of the one or more requests for changing data storage area logical configuration information to the second storage apparatus; and the second storage apparatus includes: a second change unit that changes data storage area logical configuration information for the second storage apparatus to be the same as that for the first storage apparatus, based on each of the one or more requests for changing data storage area logical configuration information sent from the transmission unit.

Accordingly, a replica of data can be created while effectively eliminating complicated tasks, such as requiring a storage apparatus administrator to create a data storage area with the same capacity in each of a first storage apparatus and a second storage apparatus and pairing-up those data storage areas, or requiring a storage apparatus administrator to judge whether or not configuration information can be changed, depending on the progress of data replication.

The present invention also provides A data replication method for a storage system having a first storage apparatus connected to a host system, that stores data sent from the host system, and a second storage apparatus connected to the first storage apparatus, that stores backup data for the first storage apparatus, the method including: a first step of identifying one or more requests for changing data storage area logical configuration information from among one or more requests sent from the host system; a second step of, based on each of the one or more requests for changing data storage area logical configuration information identified in the first step, changing data storage area logical configuration information for the first storage apparatus; a third step of sending each of the one or more requests for changing data storage area logical configuration information to the second storage apparatus; and a fourth step of changing data storage area logical configuration information for the second storage area to be the same as that for the first storage apparatus, based on each of the one or more requests for changing data storage area logical configuration information sent in the third step.

Accordingly, a replica of data can be created while effectively eliminating complicated tasks, such as requiring a storage apparatus administrator to create a data storage area with the same capacity in each of a first storage apparatus and a second storage apparatus and pairing-up those data storage areas, or requiring a storage apparatus administrator to judge whether or not configuration information can be changed, depending on the progress of data replication.

The present invention identifies requests for changing logical configuration information relating to a data storage area from among requests sent from a host system, and based on the identified request, changes logical configuration information for a data storage area for the first storage apparatus, sending the logical configuration information for the data storage area to the second storage apparatus, and based on the sent request, changes logical configuration information relating to the data storage area for the second storage apparatus to be the same as that for the first storage apparatus. As a result, the present invention effectively eliminates complicated tasks, such as requiring a storage apparatus administrator to create a data storage area with the same capacity in each of a first storage apparatus and a second storage apparatus and pair-up these data storage areas before the data replication, or requiring a storage apparatus administrator to judge whether or not configuration information can be changed, depending on the progress of data replication.

Other aspects and advantages of the invention will be apparent from the following description and the appended claims.

BRIEF DESCRIPTION OF THE DRAWINGS

FIG. 4 is a conceptual diagram explaining the configuration of an apparatus pair management table.

FIG. 5 is a conceptual diagram explaining the configuration of a request management table.

FIG. 11 is a flowchart explaining a request processing procedure.

DETAILED DESCRIPTION OF PREFERRED EMBODIMENTS

An embodiment of the present invention is described below with reference to the drawings.

(1) First Embodiment

Figure 1:
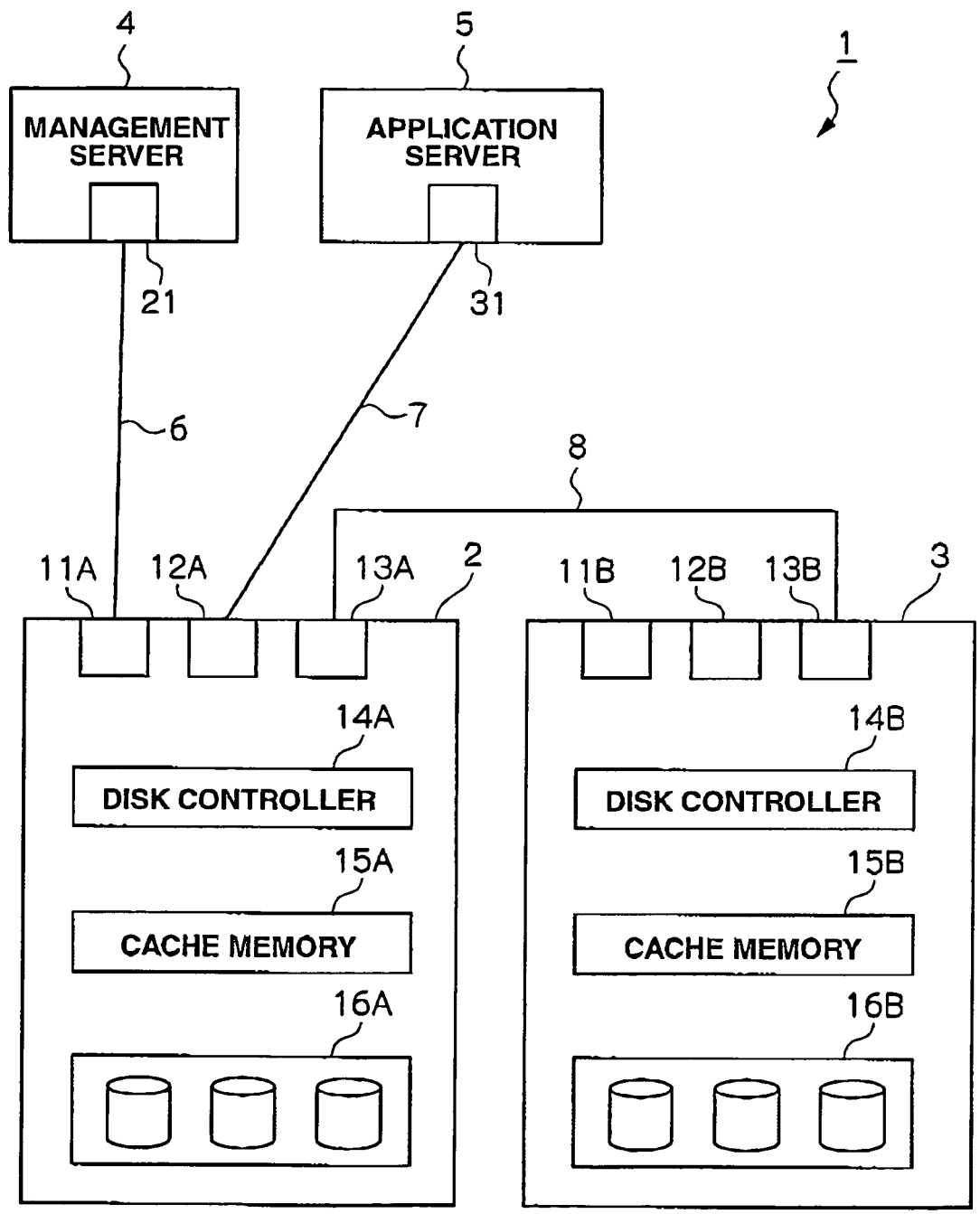
FIG. 1 is a schematic diagram showing the configuration of a storage system according to a first embodiment of the present invention.

FIG. 1 shows the configuration of a storage system according to a first embodiment. The storage system 1 has a primary storage apparatus 2, a secondary storage apparatus 3, a management server 4, and an application server 5, connected via networks 6 to 8.

The primary storage apparatus 2 is a storage apparatus for storing data for the application server 5. The primary storage apparatus 2 includes input/output interfaces 11A to 13A for external connection; a disk controller 14A that processes requests from the management server 4 and the application server 5, and performs the internal control of the primary storage apparatus 2; cache memory 15A that temporarily stores data; and a group of disk drives 16A that store data.

The secondary storage apparatus 3 has the same configuration as that of the primary storage apparatus 2. In FIG. 1, the same reference numbers as those for the components of the primary apparatuses 2 are provided for the corresponding components of the secondary storage apparatus 3, with "B" instead of "A". In that scenario, it is necessary that the primary storage apparatus 2 and the secondary storage apparatus 3 have the same hardware configuration in terms of the number of input/output interfaces, the number of disk controllers, the capacity of cache memory, and the number of disk drives, etc.

The management server 4 is a server that makes instructions for management of the primary storage apparatus 2 configuration. The management server 4 is a computer apparatus having information processing resources such as a CPU (Central Processing Unit) and memory, and may be, for example, a personal computer, or a work station. The management server 4 includes information input devices (not shown) such as a keyboard, a switch, a pointing device, or a microphone; and information output devices (not shown) such as a monitor display or a speaker; and an input interface 21, and is connected to the input/output interface 11A for the primary storage apparatus 2 via the input/output interface 21 and the network 6.

The application server 5 is a server that writes data to the primary storage apparatus 2 and reads data from the primary storage apparatus 2. The application server 5 is a computer apparatus having information processing resources such as a CPU and memory, and may be, for example, a personal computer or a work station. The application server 5 includes information input devices (not shown) such as a keyboard, a switch, a pointing device, or a microphone; and information output devices (not shown) such as a monitor display or a speaker; and an input interface 31, and is connected to the input/output interface 12A for the primary storage apparatus 2 via the input/output interface 31 and the network 7.

The input/output interface 13A for the primary storage apparatus 2 and the input/output interface 13B for the secondary storage apparatus 3 are connected via the network 8. The primary storage apparatus 2 creates a replica of data stored in the primary storage apparatus 2 in the secondary storage apparatus 3 and changes the secondary storage apparatus 3 configuration to match that of the primary storage apparatus 2 via this network 8.

The networks 6 to 8 may be, for example, SANs (Storage Area Networks), LANs (Local Area Networks), the Internet, public lines or dedicated lines. Communication between the primary storage apparatus 2, the secondary storage apparatus 3, the management server 4 and the application server 5 via the networks 6 to 8 is conducted according to Fibre Channel Protocol if the networks 6 to 8 are SANs, and according to TCP/IF (Transmission Control Protocol/Internet Protocol) if the networks 6 to 8 are LANs.

Figure 2:
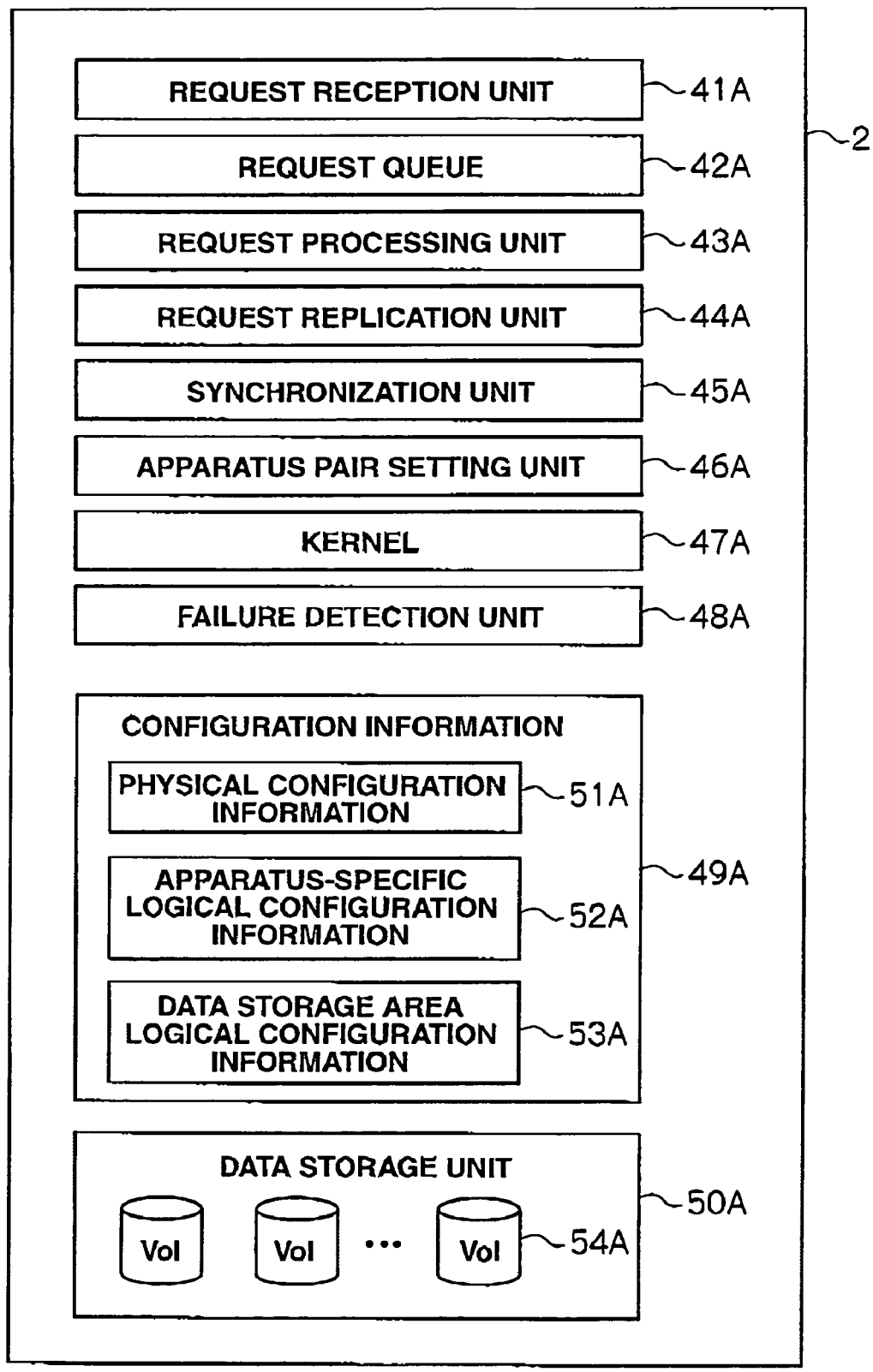
FIG. 2 is a schematic diagram showing the internal logical configuration of a primary storage apparatus.

FIG. 2 shows the internal logical configuration of the primary storage apparatus 2. The primary storage apparatus 2 includes a request reception unit 41A, a request queue 42A, a request processing unit 43A, a request replication unit 44A, a synchronization unit 45A, an apparatus pair setting unit 46A, a kernel 47A, a failure detection unit 48A, configuration information 49A and a data storing unit 50A.

The data storing unit 50A is managed by the disk controller 14A according to RAID methodology (Redundant Array of Independent Disks). One or more logical volumes are defined over physical storage areas provided by one or more disk drives. Data is stored in block units (hereinafter referred to as "logical units (LU)") of a predetermined size in these logical volumes. One or more logical volumes may also be defined for one or more logical volumes.

The configuration information 49A includes physical configuration information 51A, apparatus-specific logical configuration information 52A, and data storage area logical configuration information 53A.

Examples of the physical configuration information 51A include information indicating from which disk drives a RAID group is formed, information indicating which disk drives are spare disk drives, and information relating to component failures.

Examples of the apparatus-specific logical configuration information 52A include the hierarchy relationship between the storage apparatuses, i.e., the distinction between the primary storage apparatus 2 and the secondary storage apparatus 3, performance monitoring information, and log information.

Examples of the data storage area logical configuration information 53A include logical volume configuration information, information about paths from the logical volumes to the input/output interfaces 11A to 13A, information about access control to the logical volumes, information relating to the replication relationships between the volumes, such as snapshot volume replication relationship.

Figure 3:
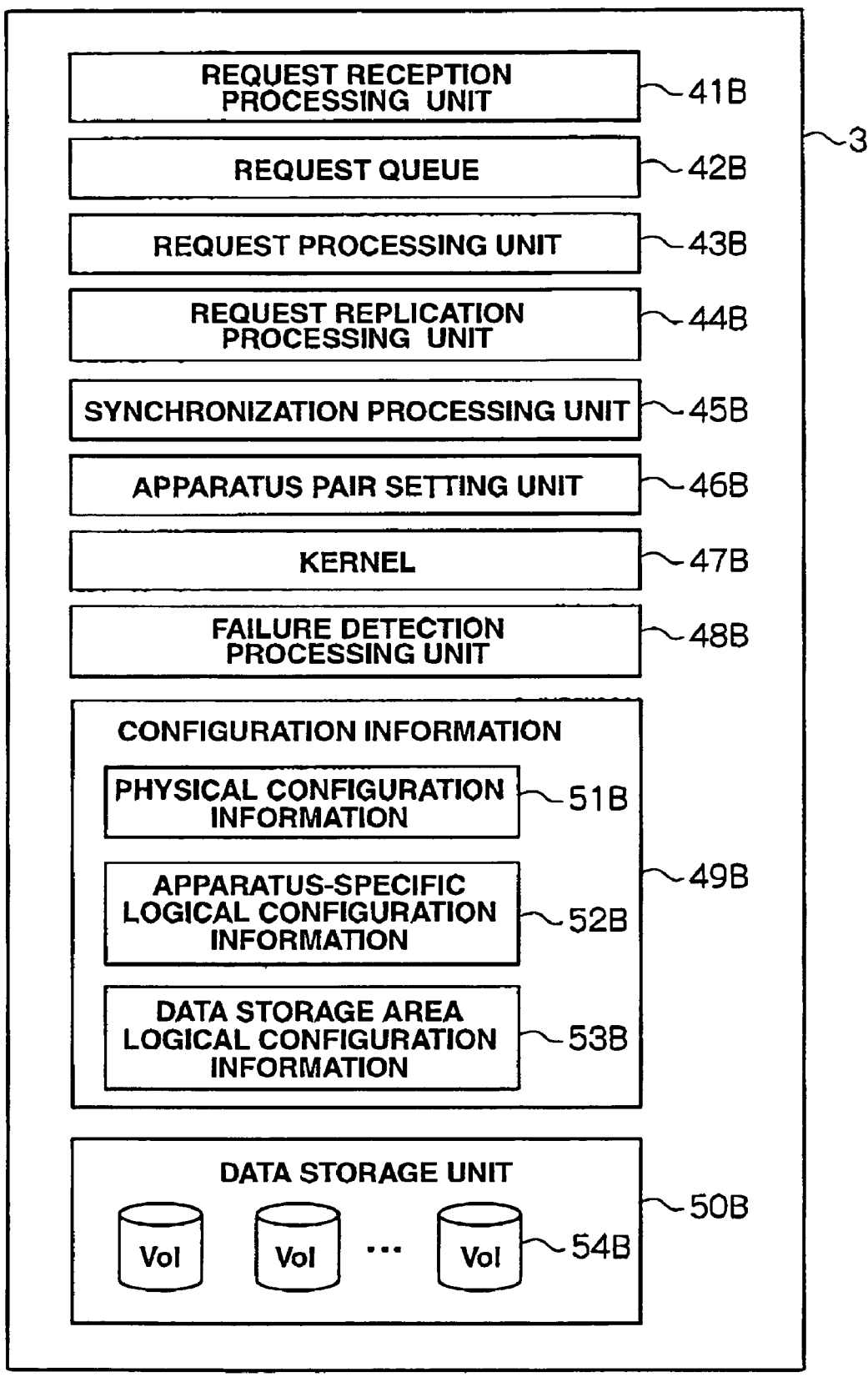
FIG. 3 is a schematic diagram showing the internal logical configuration of a secondary storage apparatus.

FIG. 3 shows the internal logical configuration of the secondary storage apparatus 3. The secondary storage apparatus 3 has the same configuration as that of the primary storage apparatus 2. In FIG. 3, the same reference numerals as those for the primary storage apparatus 2 are provided for the corresponding secondary storage apparatus 3, with "B" instead of "A." However, since the secondary storage apparatus 3 is the destination where a replica of data and configuration information is created, it is constructed so that it cannot make the request replication unit 44B, the synchronization unit 45B, and the apparatus pair setting unit 46B operate.

The gist of operation in the present embodiment will be explained below. First, the management server 4 instructs the primary storage apparatus 2 to pair-up with the secondary storage apparatus 3. Then the primary storage apparatus 2 sends the data storage area logical configuration information 53A from among its own configuration information 49A to the secondary storage apparatus 3. As a result, a replica of the data storage area logical configuration information 53A is created as the data storage area logical configuration information 53B, and the data storage area logical configuration information 53A for the primary storage apparatus 2 and the data storage area logical configuration information 53B for the secondary storage apparatus 3 are matched with each other.

Next, the primary storage apparatus 2 pairs up each of the logical volumes 54A in its own apparatus with each corresponding logical volume 54B in the secondary storage apparatus 3, and sends all the data stored in the logical volumes 54A in the primary storage apparatus 2 to the secondary storage apparatus 3. As a result, replicas of all the logical volumes 54A are created in the corresponding logical volumes 54B in the secondary storage apparatus 3, completing initial replication of data in the primary storage apparatus 2 in the secondary storage apparatus 3.

The primary storage apparatus 2 and the second storage apparatus 3, after the completion of the initial copy, each change their apparatus status to 'paired' (PAIR). The primary storage apparatus 2, upon receipt of data update requests and configuration information change requests, sends the data update requests and configuration information change requests to the secondary storage apparatus 3 in order of reception. The order in that scenario can be ensured by the data update requests and configuration information change requests being managed in one request queue (described later). The primary storage apparatus 2 receives requests and sends the received requests to the secondary storage apparatus 3. This makes it possible to maintain the replica of data and configuration information of the primary storage apparatus 2 in the secondary storage apparatus 3.

If a failure has occurred and data or configuration information becomes unmatched, the primary storage apparatus 2 and the secondary storage apparatus 3 changes the apparatus status from 'paired' to 'suspended' (SUSPEND), and temporally halts subsequent maintenance of the replication. The primary storage apparatus 2 and the secondary storage apparatus 3, after the removal of the cause of the failure, conduct the aforementioned initial copy again, making it possible to resume the maintenance of the replica. However, the replication of all data is not necessary. It is sufficient that a replica of only data in the logical volumes 54A that has been updated during the 'suspended' status is created in the secondary storage apparatus 3, and this is accomplished using log information for write requests.

Next, the details of the execution of the above operation will be explained below. FIG. 4 shows an apparatus pair management table 60. The apparatus pair management table 60 is contained in each of the apparatus-specific logical configuration information 52A and 52B. The apparatus pair management table 60 includes an apparatus pair type 61, a corresponding apparatus 62, an apparatus pair status 63, and a logical volume pair status 64.

The apparatus pair type 61 indicates whether its own apparatus is a primary storage apparatus 2 or a secondary storage apparatus 3. "PRIMARY" means that the apparatus is a primary storage apparatus 2, and "SECONDARY" means that the apparatus is a secondary storage apparatus 3. The corresponding apparatus 62 shows a unique ID to identify the corresponding apparatus for the apparatus pair. For example, an IP (Internet Protocol) address, a DNS (Domain Name System) name, a WWN (World Wide Name) can be used for the ID. The apparatus pair status 63 shows the pair status of the apparatus. "PAIR" means that the apparatus is in 'paired' status and the replica is current. "SUSPENDED" means that the apparatus is in 'suspended' status and the replica is not current for some reason, such as a failure, and the replication is temporarily suspended. "SMPL" means that the apparatus is in 'SMPL' status, and has no relationship with any of the other apparatuses. Before setting an apparatus pair, an apparatus is set to 'SMPL.' The logical volume pair status 64 indicates the pair status for all the logical volumes in the apparatus. In that scenario, all the logical volumes are changed to 'paired' status.

Figures 6, 7:
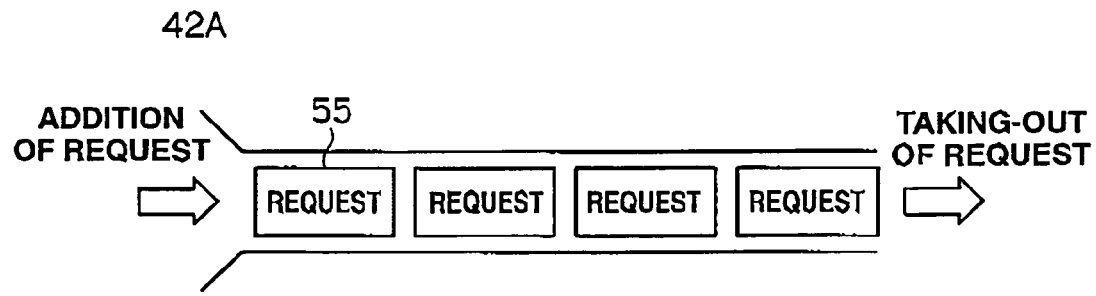
FIG. 6 is a conceptual diagram explaining the configuration of a request management table.
FIG. 7 is a conceptual diagram explaining a request queue.

FIGS. 5 and 6 show individual request management tables 70 managed in the request queue 42A. The request management table 70 contains apparatus-specific logical configuration information 52A, and includes a request ID 71, a request time 72, a request type 73, a command name 74, and a parameter 75.

The request ID 71 shows a unique ID assigned to identify a request. The request time 72 indicates the time when the primary storage apparatus 2 received a request from the application server 5. The request type 73 indicates the type of request. Examples of the request type include "DATA_WRITE," indicating a request for updating data in a logical volume, "DATA_READ," indicating a request for referring to data in a logical volume, "PHYSICAL_INFO," indicating a request for updating physical configuration information, "LOGICAL_DEV_INFO," indicating a request for updating apparatus-specific logical configuration information, and "LOGICAL_VOL_INFO," indicating a request for updating data storage area logical configuration information.

The command name 74 indicates the content of a request. There are various kinds of request content, so only a few examples will be described. An example is a "CREATE_LUN" command to create a new logical volume, which is a request for updating data storage area logical configuration information. Another example is a "WRITE" command to update data in a logical volume. The parameter 75 indicates arguments affixed to a command. These arguments determine the specific target for executing the command. For example, when a new logical volume is created, the RAID group and the location in the RAID group to create the logical volume, and the size of the logical volume are designated as parameters. Another example is that when updating data in a logical volume, the logical volume, and the location in the target logical volume, the data to be written and the data size are specified.

FIG. 5 shows a request management table 70 when the request type 73 is a logical volume creation. FIG. 6 shows a request management table 70 when the request type 73 is a logical volume data update.

A plurality of requests may be issued in parallel to the primary storage apparatus 2. The primary storage apparatus 2 manages the order of these requests using the request queue in order of the reception times for these requests, and sequentially processes the requests in that order. FIG. 7 shows the request queue 42A. The request queue 42A manages multiple requests 55, which represents request management tables 70, in a queue. In other words, a new request 55 is put at the end of the request queue 42A, and the requests 55 are sequentially processed staring from the request 55 at the top of the request queue 42A. Consequently, in the storage system 1, the order of data updates and the order of configuration information changes will not differ from each other, which prevents inconsistency.

Figure 8:
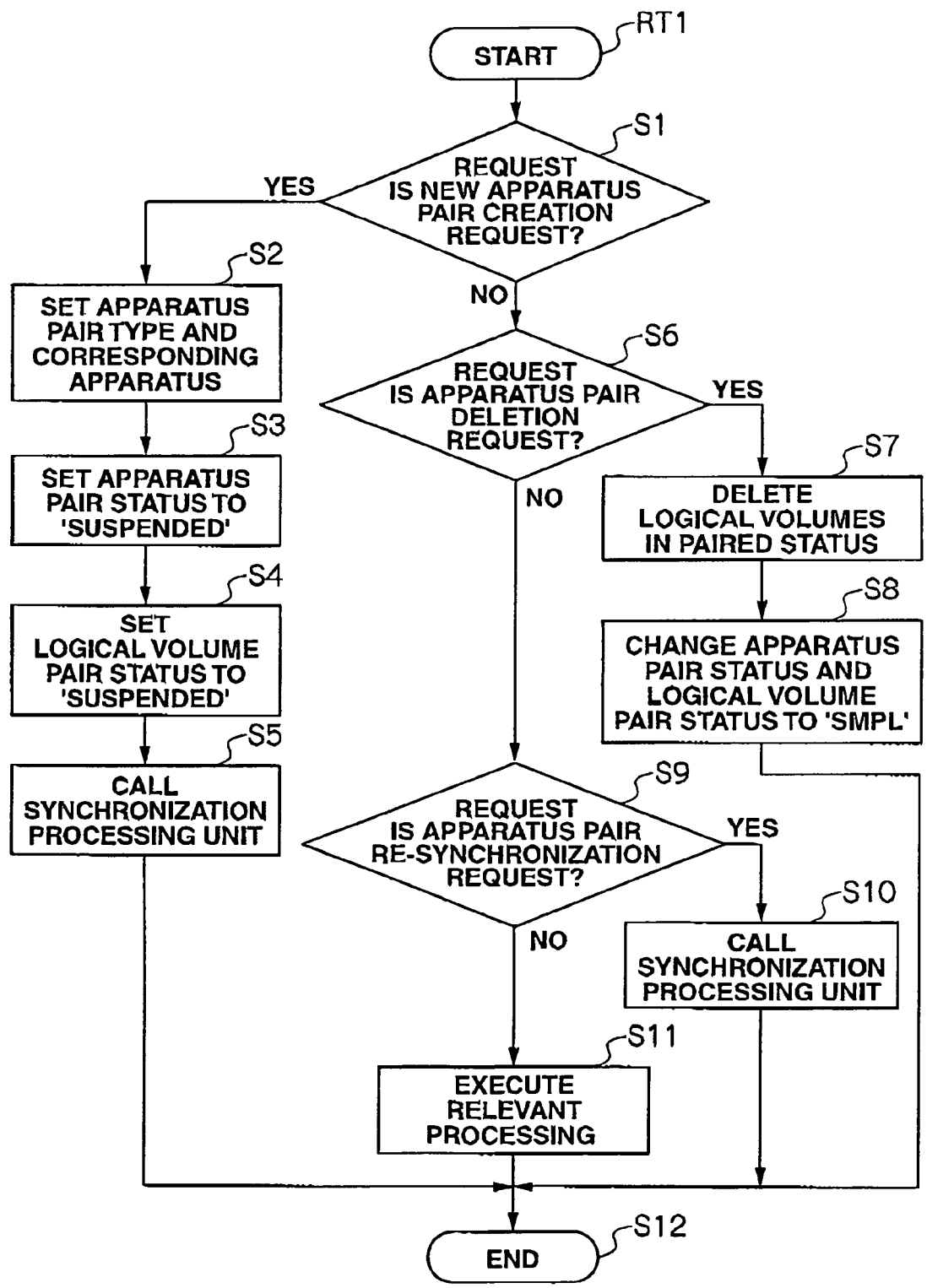
FIG. 8 is a flowchart explaining an apparatus pair setting procedure.

FIG. 8 is a flowchart showing the details of the operation of the apparatus pair setting unit 46A in the primary storage apparatus 2. When the management server 4 makes a change in the apparatus pair settings to the primary storage apparatus 2 via a network, first, the apparatus pair setting unit 46A is activated by the kernel 47A. Subsequently, the apparatus pair setting unit 46A checks whether or not the request is a new apparatus pair creation request, according to the apparatus pair setting procedure RT1 shown in FIG. 8 (S1).

If the request is a new apparatus pair creation request (S1: YES), the apparatus pair setting unit 46A creates a new apparatus pair management table 60, and sets the apparatus pair type 61 and the corresponding apparatus 62 in the apparatus pair table 60 (S2). In this case, the identifier for the corresponding apparatus 62 is contained in the new apparatus pair creation request.

Subsequently, the apparatus pair setting unit 46A sets the apparatus pair status in the apparatus pair management table 60 to 'suspended' (S3). The apparatus pair setting unit 46A then sets the logical volume pair status 64 in the apparatus pair management table 60 to 'suspended' (S4), and activates the synchronization unit 45A (S5). As a result, the initial replication of the data storage area logical configuration information 53A and all the data in all the logical volumes 54A is conducted by the synchronization unit 45A. The apparatus pair setting unit 46A, upon completion of the initial replication, terminates the apparatus pair setting procedure RT1 (S12).

Meanwhile, if the request is not a new apparatus pair creation request (S1: NO), the apparatus pair setting unit 46A checks whether or not the request is an apparatus pair deletion request (S6).

If the request is an apparatus pair deletion request (S6: YES), the apparatus pair setting unit 46A deletes the logical volumes 54A and logical volumes 54B with the 'paired' apparatus pair status 63 and the 'paired' logical volume pair status 64 in the apparatus pair management table 60 (S7). Subsequently, the apparatus pair setting unit 46A changes the apparatus pair status 63 and the logical volume pair status 64 in the apparatus pair management table 60 to 'SMPL' (S8). When the apparatus pair status 63 and the logical volume pair status 64 in the apparatus pair management table 60 has been changed to 'SMPL,' the apparatus pair setting unit 46A terminates the apparatus pair setting procedure RT1 shown in FIG. 8 (S12).

Meanwhile, if the request is not an apparatus pair deletion request (S6; NO), the apparatus pair setting unit 46A checks whether or not the request is an apparatus pair re-synchronization request (S9).

If the request is an apparatus pair re-synchronization request (S9:YES), the apparatus pair setting unit 46A activates the synchronization unit 45A (S10). As a result, replication for re-synchronization of the data storage area logical configuration information 53A and all the data in all the logical volumes 54A in the primary storage apparatus 2 in the secondary storage apparatus 3 is conducted by the synchronization unit 45A. Upon completion of the replication for re-synchronization, the synchronization unit 45A terminates the apparatus pair setting procedure RT1 shown in FIG. 8 (S12).

Meanwhile, if the request is not an apparatus pair re-synchronization request (S9: NO), the apparatus pair setting unit 46A executes processing relevant to the content of the request (S11). Upon completion of that processing, the apparatus pair setting unit 46A terminates the apparatus pair setting procedure RT1 shown in FIG. 8 (S12).

Figure 9:
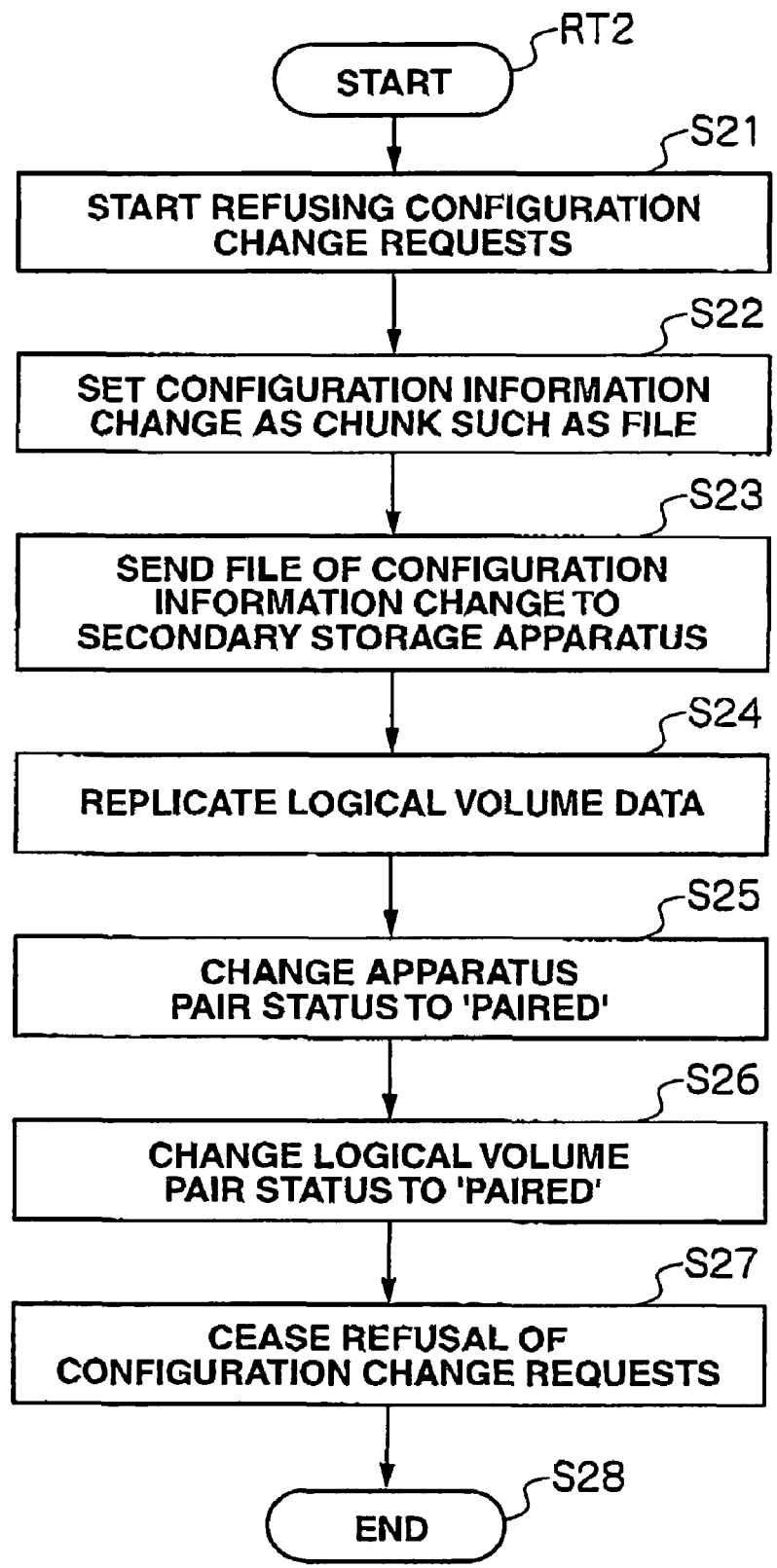
FIG. 9 is a flowchart explaining a synchronization procedure.

FIG. 9 is a flowchart showing the details of the operation of the synchronization unit 45A in the primary storage apparatus 2. The synchronization unit 45A executes synchronization processing to match data and configuration information for the primary storage apparatus 2 and those for the secondary storage apparatus 3. The content of data and configuration information for the primary storage apparatus 2 and those for the secondary storage apparatus 3 are greatly different from each other when a new pair has been formed, or when the apparatus pair status 63 in the apparatus pair management table 60 is 'suspended' for a while. Synchronization processing is performed to adjust these differences. During synchronization processing, requests for data reference or update will be accepted, but configuration information change requests will be refused.

First, the synchronization unit 45A is activated by the apparatus pair setting unit 46A. Subsequently, the synchronization unit 45A starts refusing configuration information change requests, according to the synchronization procedure RT2 shown in FIG. 9 (S21). From that time until the end of the refusal period, the synchronization unit 45A returns all configuration change requests issued from the management server 4 as errors. Next, the synchronization unit 45A sets the data storage area logical configuration information 53A as a chunk such as a file (S22). The synchronization unit 45A then sends the set data storage area logical configuration information 53A file to the secondary storage apparatus 3 (S23). As a result, a replica of the data storage area logical configuration information 53A file is created in the secondary storage apparatus 3.

The secondary storage apparatus 3, upon completion of replication for changing the data storage area logical configuration information 53A file, opens the data storage area configuration information 53A file, and replaces the data storage area logical configuration information 53B with it.

Then, the synchronization unit 45A creates a replica of data stored in the logical volumes 54A (S24). In that scenario, for initial replication, the synchronization unit 45A sends all data in the all the logical volumes 54A to the secondary storage apparatus 3, and as a result, a replica of all data in the all the logical volumes 54A is created in the logical volumes 54B. Also, for re-synchronization replication, where the location of data to be changed is recorded in the write request log information, the synchronization unit 45A only sends data in the logical volume 54A that is the target for the change, and as a result, a replica of data in the logical volume 54A is created in the corresponding logical volume 54B.

Subsequently, the synchronization unit 45A changes the apparatus pair status 63 in the apparatus pair management table 60 from 'suspended' to 'paired' (S25). It then changes the logical volume pair status 64 in the apparatus pair management table 60 from 'suspended' to 'paired' (S26), and ceases refusing configuration change requests (S27). The synchronization unit 45A, upon the cessation of the refusal of configuration change requests, terminates the synchronization procedure RT2 shown in FIG. 9 (S27).

Figure 10:
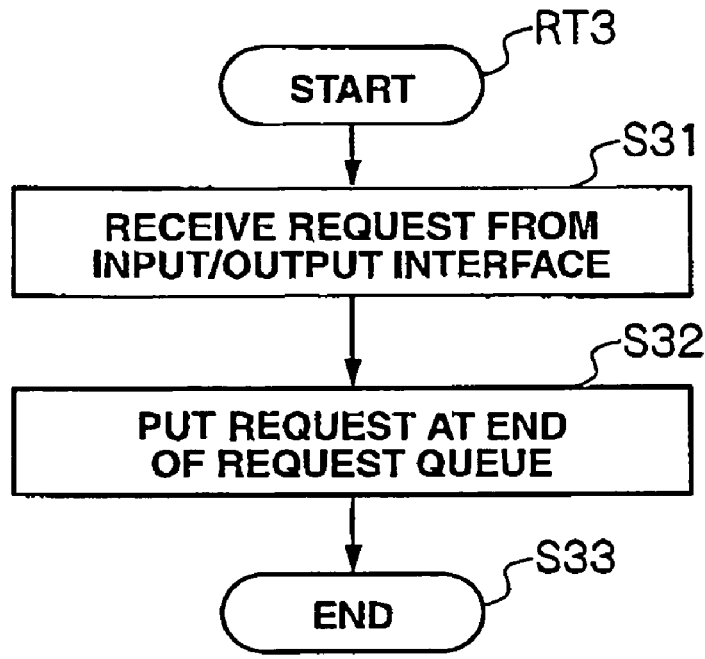
FIG. 10 is a flowchart explaining a request reception procedure.

FIG. 10 is a flowchart showing the details of the operation of the request reception unit 41A in the primary storage apparatus 2. The request reception unit 41A performs the processing for receiving requests from the management server 4 and the application server 5 that have been received via the input/output interfaces 11A and 12A, and putting the requests into the request queue 80.

Upon the input/output interface 11A or 12A's receipt of some kind of request, first, the request reception unit 41A is activated by the kernel 47A. Then the request reception unit 41A receives the request from the input/output interface 11A or 12A according to the request reception procedure RT3 shown in FIG. 10 (S31). Subsequently, the request reception unit 41A creates a request management table 70 from the content of the received request, and puts the request 55 representing the created request management table 70 at the end of the request queue 80 (S32). In that scenario, the request reception unit 41A sets the request type 73 in the request management table 70 according to the content of the received request.

If the received request is, for example, a logical volume creation request, which is a request for changing data storage area logical configuration information, the request reception unit 41A sets "LOGICAL_VOL_INFO" as the request type 73. This request type 73 information is used to determine whether or not the content of the request should be reflected in the secondary storage apparatus 3. The synchronization unit 45A puts the request 55 representing the created request management table 70 at the end of the request queue 80, and then terminates the request reception procedure RT3 shown in FIG. 10 (S33).

FIG. 11 shows a flowchart showing the details of the operation of the request processing unit 43A in the primary storage apparatus 2. First, the request processing unit 43A is periodically called by the kernel 47A. Then, the request processing unit 43A takes a request 55 out of the request queue 80 according to the request processing procedure RT4 shown in FIG. 11 (S41), and checks whether or not the request type 73 in the request management table 70 is "DATA_READ" (S42).

If the request type 73 in the request management table 70 is "DATA_READ" (S42: YES), the request processing unit 43A executes the processing for reading the relevant data from the relevant logical volume 54A (S43), returns the result of the request 55 to the management server 4 or application server 5 that has sent the request 55 (S52), and terminates the request processing procedure RT4 shown in FIG. 11 (S53).

If the request type 73 in the request management table 70 is not "DATA_READ" (S42: NO), the request processing unit 43 checks whether or not the request type 73 in the request management table 70 is "PHYSICAL_INFO" or "LOGICAL_DEV_INFO" (S44).

If the request type 73 in the request management table 70 is "PHYSICAL_INFO" or "LOGICAL_DEV_INFO" (S44: YES), the request processing unit 43A executes the processing for changing the relevant physical configuration or apparatus-specific logical configuration information (S45), returns the result of the request 55 to the management server 4 or application server 5 that has sent the request 55 (S52), and then terminates the request processing procedure RT4 shown in FIG. 11 (S53).

Meanwhile, if the request type 73 in the request management table 70 is not "PHYSICAL_INFO" or "LOGICAL_DEV_INFO" (S44: NO), the request processing unit 43A checks whether or not the request type 73 in the request management table 70 is "DATA_WRITE" (S46).

If the request type 73 in the request management table 70 is "DATA_WRITE" (S46: YES), the request processing unit 43A executes the processing for writing the relevant data to the relevant logical volume 54A (S47), and activates the request replication unit 44A (550). Then it returns the result of the request 55 to the management server 4 or application server 5 that has sent the request 55 (S52), and terminates the request processing procedure RT4 shown in FIG. 11 (S53).

Meanwhile, if the request type 73 in the request management table 70 is not "DATA_WRITE" (S46: NO), the request processing unit 43A checks whether or not the request type 73 in the request management table 70 is "LOGICAL_VOL_INFO" (S48).

If the request type 73 in the request management table 70 is "LOGICAL_VOL_INFO" (S48: YES), the request processing unit 43A executes the processing for changing the relevant data storage area logical configuration information 53A (S49) and activates the request replication unit 44A (S50). It then returns the result of the request 55 to the management server 4 or application server 5 that has sent the request 55 (S52), and terminates the request processing procedure RT4 shown in FIG. 11.

Meanwhile, if the request type 73 in the request management table 70 is not "LOGICAL_VOL_INFO" (S48: NO), the request processing unit 43A executes the processing relevant to the request 55 (S51), returns the result of the request 55 to the management server 4 or application server 5 that has sent the request 55 (S52), and then terminates the request processing procedure R14 shown in FIG. 11 (S53).

As described above, the request processing unit 43A judges whether or not a received request 55 should be reflected in the secondary storage apparatus 3, according to the request type 73 in the request management table 70.

Figure 12:
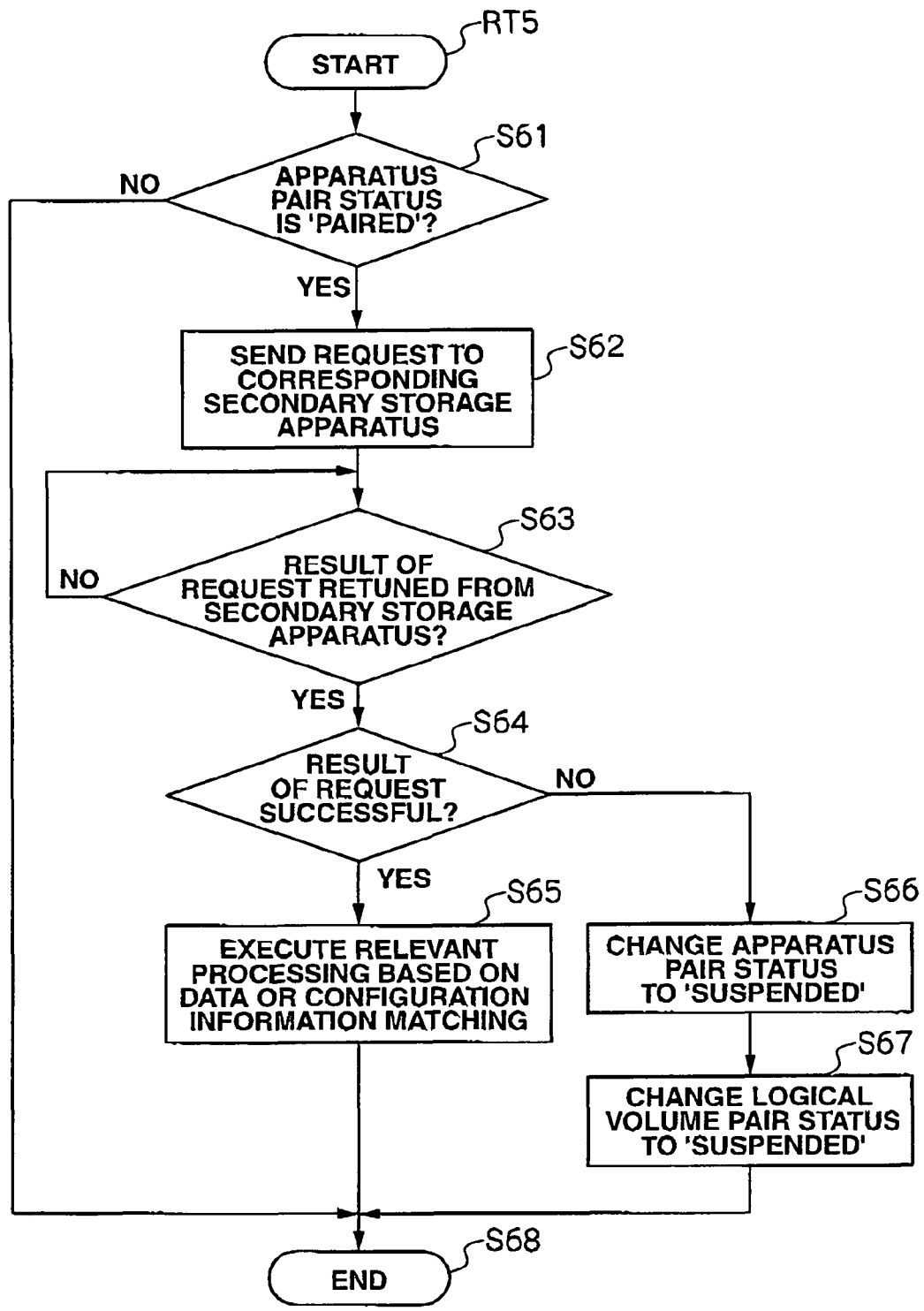
FIG. 12 is a flowchart explaining a request replication procedure.

FIG. 12 is a flowchart showing the details of the operation of the request replication unit 44A in the primary storage apparatus 2. In that scenario, FIG. 12 shows replication processing using a synchronous method, and the same processing using an asynchronous method will be described later.

The synchronous method is a method in which, upon completion of a change in the primary storage apparatus 2, the change is also performed on the secondary storage apparatus 3, and upon completion of that change, the result of the request 55 is returned to the management server 4 or application server 5 that has sent the request 55. The asynchronous method is a method in which when a change in the primary storage apparatus 2 has been completed, the result of the request 55 is returned to the management server 4 or application server 5 that has sent the request 55, and after that, the change is conducted on the secondary storage apparatus 3.

The synchronous method has an advantage in that the status of primary storage apparatus 2 and that of the secondary storage apparatus 3 are always matched, but it has a disadvantage in that performance for processing requests will be suffer. Meanwhile, the asynchronous method has an advantage in that performance for processing requests will be improved, but has a disadvantage in that a time lag occurs when the content of a change in the primary storage apparatus 2 is reflected in the secondary storage apparatus 3, and that if the primary storage apparatus 2 is disabled due to any failure in the meantime, the change will not be reflected in the secondary storage apparatus 3.

The request replication unit 44A executes the request replication processing for reflecting the content of any request targeting the primary storage apparatus 2 in the secondary storage apparatus 3. First, the request replication unit 44A is activated by the request processing unit 43A. Subsequently, the request replication unit 44A, referring to the apparatus pair management table 60, checks whether or not the apparatus pair status 63 is 'paired,' according to the request replication procedure RT5 shown in FIG. 12(S61).

If the apparatus pair status 63 is not 'paired' (S61: NO), the request replication unit 44A terminates the request replication procedure RT5 shown in FIG. 12 (S62) because there is no need to reflect the request 55 in the secondary storage apparatus 3. Meanwhile, if the apparatus pair status 63 is 'paired' (S61: YES), the request replication unit 44A sends the request 55 to the secondary storage apparatus 3, which is the corresponding apparatus 62 in the apparatus pair management table 60 (S62).

Subsequently, the request replication unit 44A waits, in standby mode, for the result of the sent request 55 to be returned from the secondary storage apparatus 3 (S63). The request replication unit 44A, upon receipt of the result of the sent request 55 from the secondary storage apparatus 3 (S63: YES), checks whether or not the result of the sent request 55 was successful (S64).

If the result of the sent request 55 was successful (S64: YES), which means that the data or configuration information in the primary storage apparatus 2 and the secondary storage apparatus 3 are matched, the request replication unit 44A executes the relevant processing based on the matched data or configuration information (S65).

As an example of relevant processing based on the matched data or configuration information, if the content of the request 55 is creation of a new logical volume, which requires the pairing-up of a new logical volume created in the primary storage apparatus 2 and one created in the secondary storage apparatus 3, the request replication unit 44A executes the processing for creating a logical volume pair. Also, if the content of the request 55 is a logical volume deletion, it executes the processing for deleting the relevant logical volume pair.

Meanwhile, if the result of the sent request 55 was not successful (S64: NO), which means that a failure has occurred in the secondary storage apparatus 3 and the data and configuration stored in the primary storage apparatus 2 and the secondary storage apparatus 3 has become unmatched, the request replication unit 44A changes the apparatus pair status 63 in the apparatus pair management table 60 to 'suspended' (S66). Subsequently, the apparatus pair management table 60 to 'suspended' (S67).

The request replication unit 44A then terminates the request replication procedure RT5 shown in FIG. 12 (S68).

Figure 13:
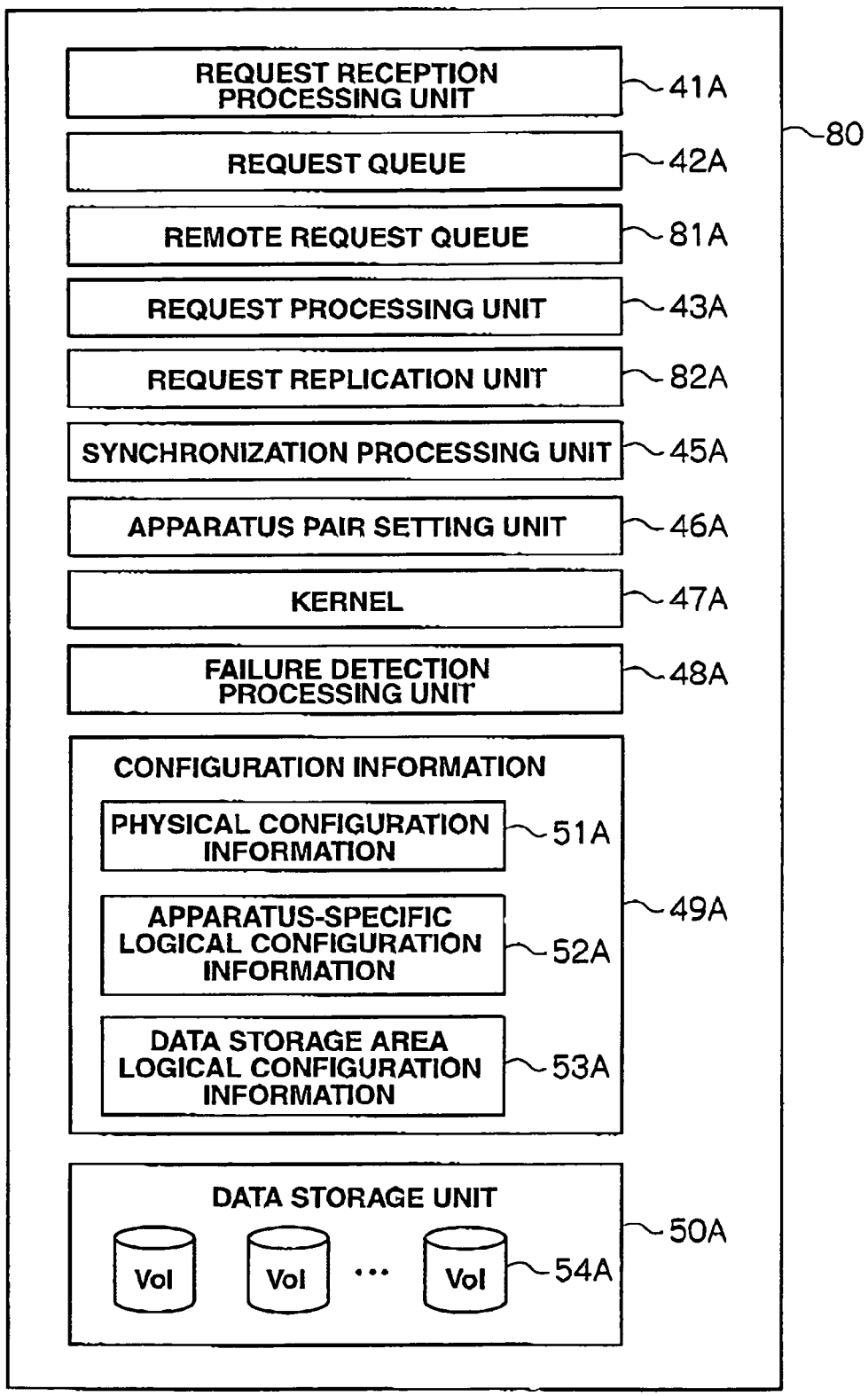
FIG. 13 is a schematic diagram showing the internal logical configuration of a primary storage apparatus used in an asynchronous method.

Next, the replication processing according to an asynchronous method will be explained. FIG. 13 shows the internal logical configuration of a primary storage apparatus 80 used in an asynchronous method. The primary storage apparatus 80 has the same configuration as that of the aforementioned primary storage apparatus 2 except for the existence of a remote request queue 81A and a request replication unit 82A that performs different processing. The remote request queue 81A, like the request queue 42A, manages request management tables 70 in a queue according to the order of the times the tables 70 were received.

Figure 14:
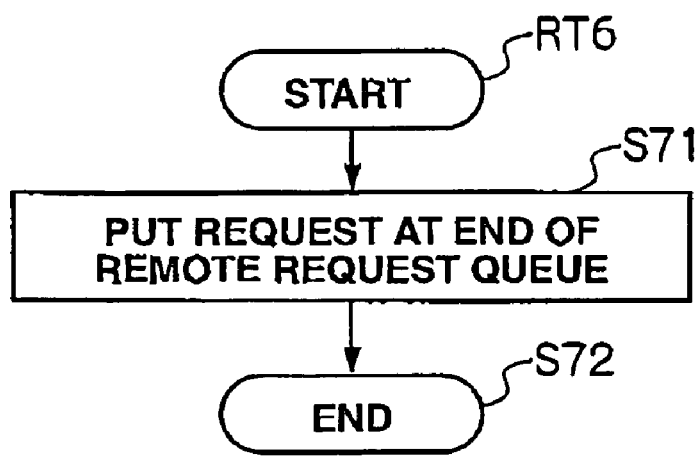
FIG. 14 is a flowchart explaining a second request replication procedure.

FIG. 14 is a flowchart showing the details of the operation of the request replication unit 82A in the primary storage apparatus 80. In that scenario, FIG. 14 shows replication processing according to an asynchronous method. First, the request replication unit 82A is activated by a request processing unit 43A, which is the same as in the synchronous method. Next, the request replication unit 82A puts the request 55 representing a request management table 70, created in the primary storage apparatus 2, at the end of the remote request queue 81A, according to the second request replication procedure RT6 shown in FIG. 14 (S71). The request replication unit 82A then terminates the second request replication procedure RT6 shown in FIG. 14 (S72). Then, the request processing unit 43A returns the result of the request 55 to the management server 4 or application server 5 that has sent the request 55. However, at this point in time, the request is not reflected in the secondary storage apparatus 3.

Figure 15:
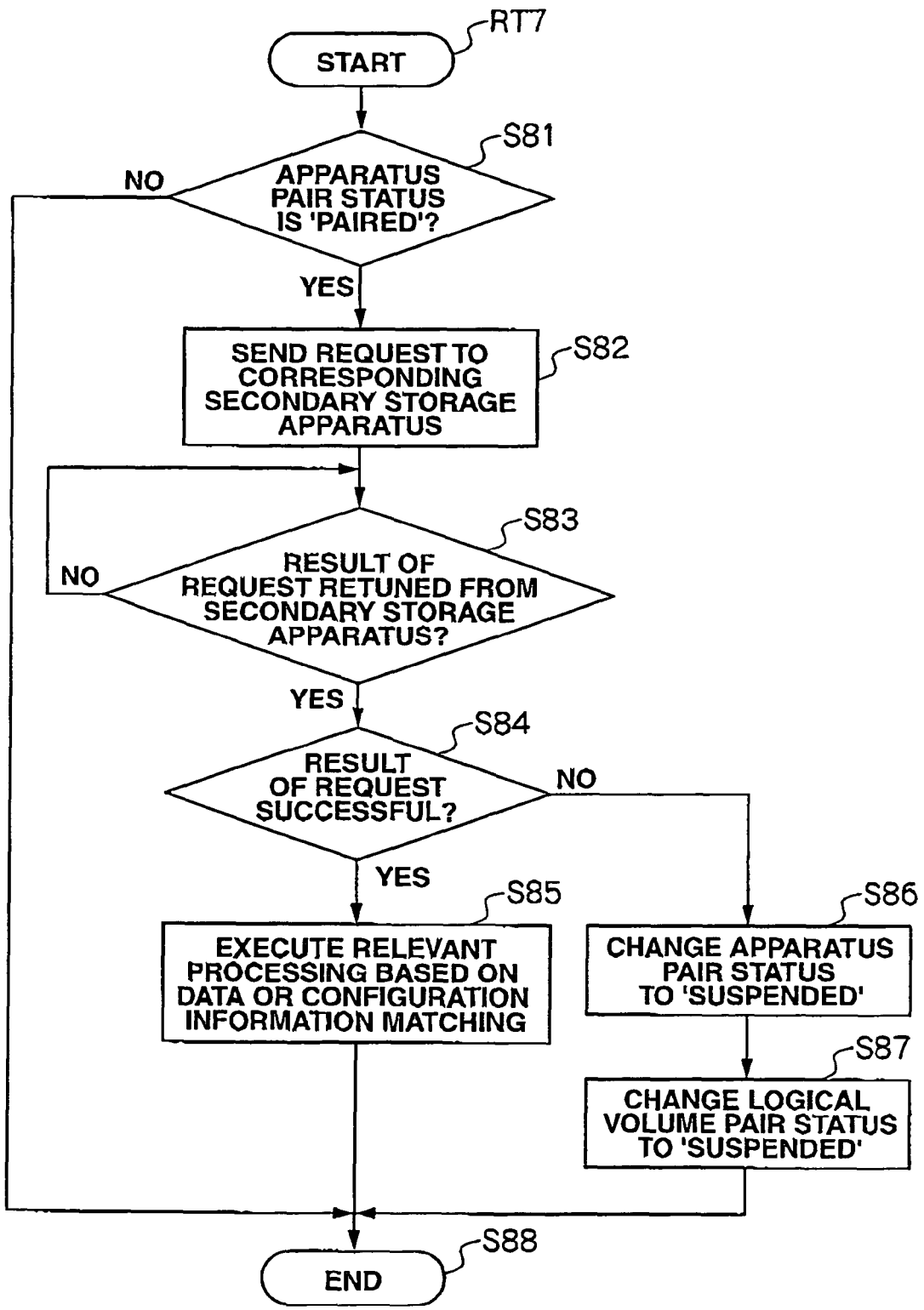
FIG. 15 is a flowchart explaining a third request replication procedure.

FIG. 15 is a flowchart showing the details of the operation of the request replication unit 82A in the primary storage apparatus 80. FIG. 15 shows replication processing according to an asynchronous method. The request replication unit 82A, first, is activated by a kernel 47A when there are requests 81 in the remote request queue 81A. Then, the request replication unit 82A executes the same processing as that at S61 to S68 in the aforementioned request replication procedure RT5, according to the third replication procedure shown in FIG. 15 (S81 to S88).

Figure 16:
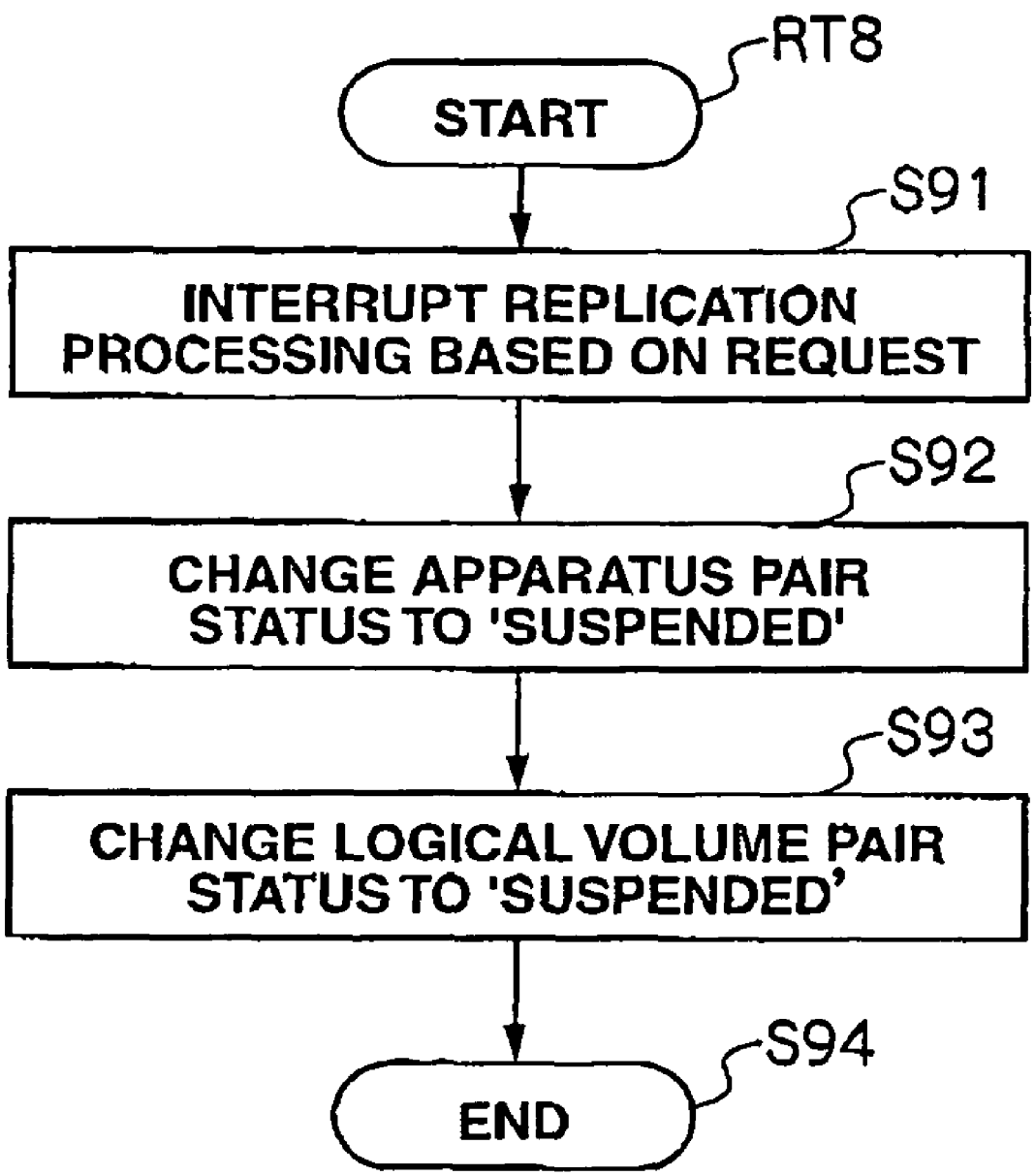
FIG. 16 is a flowchart explaining a failure detection procedure.

FIG. 16 is a flowchart showing the details of the operation of the failure detection unit 48A in the primary storage apparatus 2. Upon detection of a failure in the primary storage apparatus 2, the failure detection unit 48A is activated by the kernel 47A. Then the failure detection unit 48A interrupts the replication processing based on the request 55, according to the failure detection procedure RT8 shown in FIG. 16 (S91). Next, the failure detection unit 48A changes the logical volume pair status 64 in the apparatus pair management table 60 to 'suspended' status (S93). Then, the failure detection unit 48A terminates the failure detection procedure RT8 shown in FIG. 16 (S94).

As described above, in the storage system 1, a replica of not only data but also configuration information is created, making it possible for a storage apparatus administrator to easily build a disaster recovery system by just managing the primary storage apparatus 2, and eliminating the need for the storage apparatus administrator to change the configuration of the secondary storage apparatus 3 in line with a change in the configuration of the primary storage apparatus 2. In the storage system 1, the secondary storage apparatus 3 is a replication of the primary storage apparatus 2, and so in the event of a disaster, activity will be able to resume promptly using the secondary storage apparatus 3. Accordingly, the storage system 1 makes it possible for anyone to build a disaster recovery system without high technical skills.

(2) Other Embodiments

Figure 17:
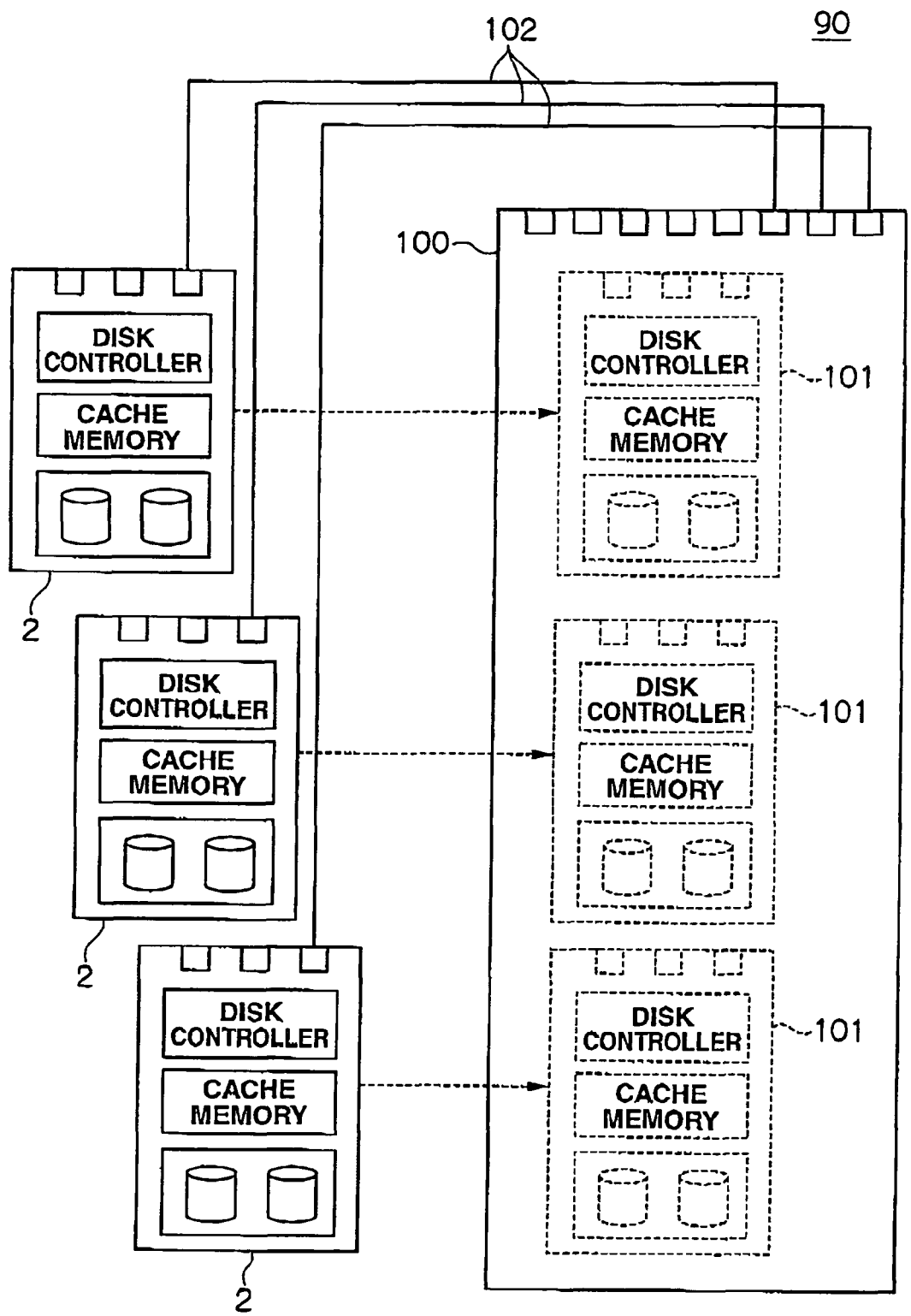
FIG. 17 is a flowchart showing the configuration of a storage system according to another embodiment of the present invention.

FIG. 17 shows a storage system 90 according to another embodiment of the present invention. In this storage system 90, the secondary storage apparatus 100 is larger in size than the primary storage apparatus 2, and has a large number of hardware components, such as input/output interfaces, disk controllers, and disk drives, and a large amount of cache memory compared to the primary storage apparatus 2. In the secondary storage apparatus 100, a virtual storage apparatus 101 is logically formed. Like the pair relationship between the aforementioned primary storage apparatus 2 and secondary storage apparatus 100, there is an apparatus pair relationship between the primary storage apparatus 2 and the virtual storage apparatus 101. The primary storage apparatus 2 and the secondary storage apparatus 100 are connected via the network 102. In this type of storage system 90, the above-described data and configuration information replication processing can be executed with the primary storage apparatus 2 and the virtual storage apparatus 101. The aforementioned data and configuration information replication processing can be conducted in the same manner as described above with various configurations other than that of the first embodiment.

The storage system 1 may be constructed so that a replica can be maintained even during a disk drive failure. In other words, since a RAID group consists of physical disk drives, the storage system 1, when a disk drive is disabled, regards that disabled disk drive as a failure, and changes the apparatus pair status 63 in the apparatus pair management table 60 to 'suspended.' However, the RAID group itself operates normally, so it is possible to continue data replication. Accordingly, replication may be continued without regarding a disk drive failure as a failure.

In the storage system 1, when creating a new RAID group, the RAID group may be regarded as data storage area logical configuration information 53A. In that scenario, the storage system 1 manages the RAID group with regard to the number of disk drives constituting the RAID group and the RAID level of the RAID group, rather than which chassis includes the RAID group and the location of the disk drives constituting the RAID group. In the storage system 1, for example, when the primary storage apparatus 2 processes a request for creating a RAID group with RAID level 5 that uses four disk drives, and disk drives A, B, C and D are used for those disk drives, the "request for creating a RAID group with RAID level 5 that uses four disk drives" is transferred to the secondary storage apparatus 3 to reflect the request in the secondary storage apparatus 3, but no instruction regarding which disk drives to use is sent to the secondary storage apparatus 3.

In the storage system 1, normally operating unused disk drives E, F, G and H are selected in the secondary storage apparatus 3 and disk drives E, F, G and H form a RAID group with the RAID 5 configuration. However, in that scenario, the storage system 1 matches the identifier for the RAID group in the primary storage apparatus 2 and the identifier for the RAID group in the secondary storage apparatus 3. This makes it possible to maintain the replica when a disk drive has a failure and available disks in the primary storage apparatus 2 do not correspond to those in the secondary storage apparatus 3.

Furthermore, in the storage system 1, an update for firmware in the primary storage apparatus 2 may be reflected also in the secondary storage apparatus 3. In that scenario, two or more disk controllers are provided in each of the primary storage apparatus 2 and the secondary storage apparatus 3, and firmware is updated first using one of the disk controllers, and then using another disk controller. During the firmware update, requests to be sent to the disk controller will be processed by another disk controller.

The storage system 1 does not necessarily consist of two storage apparatuses: the primary storage apparatus 2 and the secondary storage apparatus 3, and may consist of multiple storage apparatuses arranged in a line. In that scenario, in the storage system 1, the intermediate storage apparatuses operate in the same manner as the primary storage apparatus 2, making it possible to reflect changes made in the top primary storage apparatus 2 in the rear secondary storage apparatus 3.

In this embodiment, the aforementioned various kinds of processing may be executed by hardware having the relevant functions, or may also be executed by software. In that case, various functions can be executed by installing various programs on a computer with a program constituting the software installed in its dedicated hardware. For example, those programs can be installed from recordable media. It is a matter of course that these recordable media may be various kinds of recordable media like optical disks, magnet-optical disks, semiconductor memory. Also, various programs may be installed by downloading them via a network such as the Internet.

The present invention may be adopted in various apparatuses having a disaster recovery function.

While the invention has been described with respect to a limited number of embodiments, those skilled in the art, having benefit of this disclosure, will appreciate that other embodiments can be devised which do not depart from the scope of the invention as disclosed herein Accordingly, the scope of the invention should be limited only by the attached claims.

What is claimed is:

1. A storage system comprising:
a first storage apparatus connected to a host system, that stores data transmitted from the host system; and
a second storage apparatus connected to the first storage apparatus, that stores backup data for the first storage apparatus,
wherein the first storage apparatus includes:
first logical configuration information for a first data storage area, an identification unit that identifies one or more requests for changing the first logical configuration information from among one or more requests transmitted from the host system, a first change unit that changes the first logical configuration information based on each of the one or more requests for changing the first logical configuration information identified by the identification unit, a transmission unit that transmits each of the one or more requests for changing the first logical configuration information to the second storage apparatus, a request queue with which the one or more requests for changing the first logical configuration information are managed, a request processing unit that processes the one or more requests for changing the first logical configuration information in an order of the requests in the request queue, and a synchronization unit that starts refusing the one or more requests for changing the first logical configuration information, transmits the first logical configuration information to the second storage apparatus, creates a replica of the data transmitted from the host system, and ceases refusing the one or more requests for changing the first logical configuration information;

and the second storage apparatus includes:

a second logical configuration information for a second data storage area, a second change unit that changes the second logical configuration information to be the same as for the first logical configuration information in the first storage apparatus, based on each of the one or more requests for changing the first logical configuration information transmitted from the transmission unit.

2. The storage system according to claim 1, wherein the first logical configuration information and the second logical configuration information include logical volume configuration information.

3. The storage system according to claim 2, wherein the first change unit and the second change unit, triggered by creation of a new logical volume in each of the first storage apparatus and the second storage apparatus, change their logical volume configuration information for each of the first storage apparatus and the second storage apparatus so that the logical volumes form a pair respectively.

4. The storage system according to claim 1, wherein the transmission unit transmits one or more data update requests from among the one or more requests sent from the host system and the one or more requests for changing the first logical configuration information, in the order of transmission of those requests from the host system.

5. The storage system according to claim 4, comprising a management unit that manages the one or more data update requests and the one or more requests for changing the first logical configuration information in the same queue, wherein the transmission unit sends the one or more data update requests and the one or more requests for changing the first logical configuration information that are managed by the management unit to the second storage apparatus.

6. The storage system according to claim 1, wherein:
the transmission unit, when a new relationship is formed between the first storage apparatus and the second storage apparatus, sets the first logical configuration information for the first storage apparatus as one file, and sends the file to the second storage apparatus; and based on the file sent from the transmission unit, the second change unit replaces the second logical configuration information with the first logical configuration information to be the same as that for the first storage apparatus.

7. The storage system according to claim 1, wherein:
the transmission unit sends configuration information for a RAID group in the first storage system to the second storage apparatus, the configuration information including the number of disk drives and RAID level; and based on the configuration information for the RAID group sent from the transmission unit, the second change unit changes configuration information for a RAID group in the second storage apparatus to be the same as that for the first storage apparatus.

8. A data replication method for a storage system having a first storage apparatus connected to a host system, that stores data transmitted from the host system, and a second storage apparatus connected to the first storage apparatus, that stores backup data for the first storage apparatus, the method comprising:

a first step of identifying one or more requests for changing a first logical configuration information of a first data storage area from among one or more requests transmitted from the host system;

a second step of, based on each of the one or more requests for changing the first logical configuration information identified in the first step, changing the first logical configuration information for the first storage apparatus;

a third step of transmitting each of the one or more requests for changing the first logical configuration information to the second storage apparatus;

a fourth step of changing a second logical configuration information for a second storage area to be the same as for the first logical configuration information in the first storage apparatus, based on each of the one or more requests for changing the first logical configuration information transmitted in the third step;

a fifth step of managing the one or more requests for changing the first logical configuration information with a request queue;

a sixth step of processing the one or more requests for changing the first logical configuration information in an order of the requests in the request queue;

a seventh step of starting refusing the one or more requests for changing the first logical configuration information;

an eighth step of transmitting the first logical configuration information to the second storage apparatus;

a ninth step of creating a replica of the data transmitted from the host system; and a tenth step of ceasing refusing the requests for changing the first logical configuration information.

9. The data replication method according to claim 8, wherein the first logical storage information and the second logical configuration information include logical volume configuration information.

10. The data replication method according to claim 9, wherein each of the second step and the fourth step includes changing, triggered by creation of a new logical volume in each of the first storage apparatus and the second storage apparatus, their logical volume configuration information for each of the first storage apparatus and the second storage apparatus so that the logical volumes form a pair respectively.

11. The data replication method according to claim 8, wherein the third step includes sending one or more data update requests from among the one or more requests sent from the host system and the one or more requests for changing the first logical configuration information to the second storage apparatus, in the order of transmission of those requests from the host system.

12. The data replication method according to claim 11, wherein the third step includes sending the one or more data update requests and the one or more requests for changing the first configuration information that are managed in the same queue to the second storage apparatus.

13. The data replication method according to claim 8, wherein:
the third step includes, when forming a new relationship between the first storage apparatus and the second storage apparatus, setting the first configuration information for the first storage apparatus as one file and sending the file to the second storage apparatus; and
the fourth step includes replacing, based on the file sent in the third step, the second logical configuration information with the first logical configuration information to be the same as that for the first storage apparatus.

14. The data replication method according to claim 8, wherein:
the third step includes sending configuration information for a RAID group in the first storage apparatus, the configuration information including the number of disk drives and RAID level; and
the fourth step includes changing, based on the configuration information sent in the third step, the configuration information for a RAID group in the second storage apparatus to be the same as that for the RAID group in the first storage apparatus.

15. A storage system comprising:
a first storage apparatus connected to a host system, that stores data transmitted from the host system; and
a second storage apparatus connected to the first storage apparatus, that stores backup data for the first storage apparatus,
wherein the first storage apparatus includes:
first logical configuration information for a first data storage area,
an identification unit that identifies one or more requests for changing the first logical configuration information from among one or more requests transmitted from the host system,
a first change unit that changes the first logical configuration information based on each of the one or more requests for changing the first logical configuration information identified by the identification unit,
a transmission unit that transmits each of the one or more requests for changing the first logical configuration information to the second storage apparatus,
a request queue with which the one or more requests for changing the first logical configuration information are managed,
a request processing unit that processes the one or more requests for changing the first logical configuration information in an order of the requests in the request queue, and
a synchronization unit that starts refusing the one or more requests for changing the first logical configuration information from the host system, transmits the first logical configuration information to the second storage apparatus via the transmission unit, creates a replica of the data transmitted from the host system and stored in the first storage apparatus, for storage into the second storage apparatus and sends the replica of the data to the second storage apparatus, and then ceases refusing the one or more requests for changing the first logical configuration information from the host system;
and the second storage apparatus includes:
a second logical configuration information for a second data storage area,
a second change unit that changes the second logical configuration information to be the same as for the first logical configuration information in the first storage apparatus, based on each of the one or more requests for changing the first logical configuration information transmitted from the transmission unit; and
a synchronization processing unit that changes data in the second storage apparatus to the replica of the data sent by the synchronization unit.

\* \* \* \* \*